United States Patent [19]

Yagher, Jr. et al.

[11] Patent Number: 4,841,274
[45] Date of Patent: Jun. 20, 1989

[54] TEMPERATURE RESPONSIVE PROBE APPARATUS

[75] Inventors: Charles Yagher, Jr., Lexington; Kenneth C. Day, Mansfield, both of Ohio

[73] Assignee: Therm-O-Disc, Incorporated, Mansfield, Ohio

[21] Appl. No.: 135,247

[22] Filed: Dec. 21, 1987

[51] Int. Cl.$^4$ .......................... G01K 1/14; G01K 7/16
[52] U.S. Cl. .................................. 338/28; 338/22 R; 338/34; 374/136; 374/208
[58] Field of Search ............... 374/145, 110, 114, 115, 374/166, 135, 136; 338/28, 38, 36, 24, 34; 73/295

[56] References Cited
U.S. PATENT DOCUMENTS

| | | | |
|---|---|---|---|
| 2,660,883 | 12/1953 | Wyczalek | 374/113 X |
| 3,123,790 | 3/1964 | Tyler | 338/28 |
| 3,369,389 | 2/1968 | Schroeer et al. | 374/114 X |
| 3,493,949 | 2/1970 | Servos et al. | 374/111 |
| 3,520,187 | 7/1970 | Petersen | 374/114 |
| 3,890,588 | 6/1975 | Kanaya et al. | 338/22 R X |
| 4,166,451 | 9/1979 | Salera | 374/114 X |
| 4,349,281 | 9/1982 | Onksen et al. | 374/136 |
| 4,403,296 | 9/1983 | Prosky | 374/166 X |
| 4,587,913 | 5/1986 | Duprez | 374/145 X |
| 4,679,432 | 7/1987 | Draeger | 338/24 X |

Primary Examiner—Daniel M. Yasich
Attorney, Agent, or Firm—Jones, Day, Reavis & Pogue

[57] ABSTRACT

Temperature responsive apparatus includes a housing having a pair of spaced-apart probes, each receiving a different thermistor. The housing includes a one-piece hollow plastic shell having the pair of spaced apart probes formed integral therewith. The entire hollow interior of the shell, including the probes, is filled with plastic material to encapsulate the thermistors received within the probes.

7 Claims, 1 Drawing Sheet

TEMPERATURE RESPONSIVE PROBE APPARATUS

BACKGROUND OF THE INVENTION

This application relates to the art of temperature sensing and, more particularly, to sensing of temperatures using two different temperature responsive devices. The invention is particularly applicable to use of thermistors for sensing temperatures of a liquid, and will be described with specific reference thereto. However, it will be appreciated that the invention has broader aspects, and can be used with temperature sensing devices other than thermistors, and for sensing temperatures in other than a liquid environment.

Placing a pair of different thermistors in a single probe can result in signal errors, because the two thermistors are not adequately thermally isolated from one another. Also, the large plastic mass in a single probe increases the response time of the thermistors. The limited external surface area of a single probe enclosing two different thermistors also results in less heat transfer. It would be desirable to improve the thermal isolation between a pair of different thermistors encapsulated in a common housing, and to increase the heat transfer surface area surrounding the thermistors, while reducing the plastic mass around same.

SUMMARY OF THE INVENTION

Each of a pair of different thermistors encapsulated in a common housing is received in its own probe that projects from the housing. This significantly improves the thermal isolation between the two thermistors compared to arrangements in which a pair of thermistors are located in a single probe.

Placing each thermistor in its own probe significantly reduces the mass of plastic material at the probe end portion of the temperature responsive apparatus. This reduces the response time of the apparatus.

Placing each thermistor in its own probe increases the external surface area for heat transfer surrounding each thermistor.

In a preferred arrangement, each probe has a different cross-sectional area for receiving thermistors of different size.

In one arrangement, the pair of probes have outwardly facing surfaces that lie on the periphery of a circle. The probes have substantially flat and parallel facing surfaces that oppose one another on opposite sides of a gap.

The housing for the thermistors includes a plastic shell having an open end and a closed end portion. The pair of probes are formed in the closed end portion of the shell, and the interior of the shell is filled with plastic material that encapsulates the thermistors and their leads.

It is a principal object of the present invention to provide an improved temperature responsive apparatus using a pair of different thermistors.

It is also an object of the invention to provide a temperature responsive apparatus having improved thermal isolation between a pair of thermistors.

It is another object of the invention to provide a temperature responsive apparatus having a reduced response time, and improved heat transfer to a pair of thermistors.

DESCRIPTION OF A PREFERRED EMBODIMENT

Figure 1:
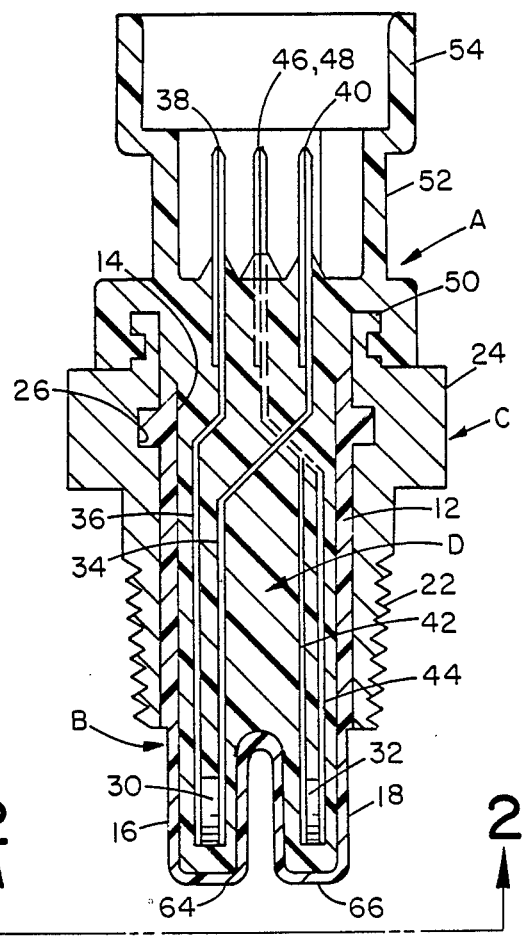
FIG. 1 is a cross-sectional elevational view of a temperature responsive apparatus constructed in accordance with the present application.

Referring now to the drawing, wherein the showings are for purposes of illustrating a preferred embodiment of the invention only, and not for purposes of limiting same, a temperature responsive apparatus A includes a housing for a pair of thermistors or other temperature responsive devices. The housing includes an elongated hollow plastic shell B having a substantially cylindrical portion 12 extending over a major portion of the length thereof. Shell B has an open upper end 14, and a closed bottom end portion that includes a pair of spaced-apart elongated probes 16, 18. The wall thickness of shell B in the area of probes 16, 18 is substantially less than the wall thickness of cylindrical portion 12.

Shell B is molded in one-piece inside of a mounting member having an externally threaded barrel section 22, and a hexagonal tool gripping section 24. An internal circumferential groove in tool gripping portion 24 fills with plastic material to interlock shell B and mounting member C.

A different thermistor 30, 32 is positioned within each probe 16, 18. Thermistor 30 has a pair of leads 34, 36 attached thereto, and to a pair of external terminals 38, 40. Thermistor 32 has a pair of leads 42, 44 attached thereto, and to a pair of external terminals 46, 48.

The entire interior of shell B, including probes 16, 18, is filled with plastic material D that encapsulates thermistors 30, 32 and their leads. Plastic material D is molded above mounting member C in surrounding relationship to a circumferential projection 50 of generally inverted L-shaped configuration. Plastic material D is molded in protective surrounding relationship to terminals 38, 40, 46 and 48 as indicated at 52, and terminates in an outwardly expanded socket portion 54.

Figure 2:
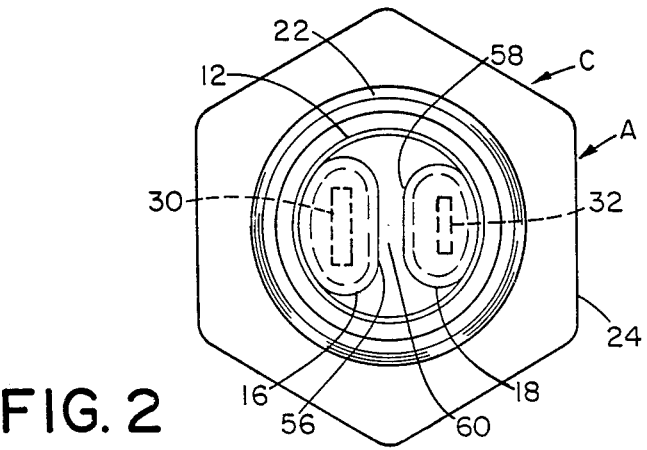
FIG. 2 is a bottom plan view taken generally on line 2—2 of FIG. 1.

As shown in FIG. 2, probes 16, 18 have outwardly facing surfaces that lie on the periphery of a common circle. In addition, probes 16, 18 have substantially flat and parallel facing surfaces 56, 58 that face one another across a gap 60.

The cross-sectional area of each probe 16, 18 is different for situations where one thermistor 30 is larger than thermistor 32. The combined cross-sectional areas of probes 16, 18 is substantially less than the area of the circle in which they are enveloped, but are at least approximately one-half the area of such circle. Terminal ends 64, 66 of probes 16, 18 are substantially flat, although it will be recognized that they could be curved for certain applications.

Instead of molding shell B as a separate member inside of mounting member C, it will be recognized that shell B and mounting member C could be molded integrally in one-piece. Shell B and plastic filler D can be of the same plastic material of any suitable type, including a polyamide or polyetherimide.

Temperature responsive apparatus A can be used under any conditions where it is desired to provide two different signals from an environment whose temperature is being monitored. Strictly by way of example, and not by way of limitation, temperature responsive apparatus A can be used for sensing the temperature of the liquid coolant in an automobile engine. A tap hole in a coolant flow passage receives threaded barrel 22 of mounting means C so that probes 16, 18 project into the liquid coolant. One thermistor 30 may send signals to an engine control module microprocessor for adjusting such variable as the air/fuel mixture. Thermistor 32 may send signals to a temperature gauge.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

We claim:

1. Temperature responsive apparatus comprising an elongated hollow plastic shell having an open end and a closed end portion, a pair of spaced-apart probes on said closed end portion, and thermistor received in each said probe to sense fluid temperature, and plastic material filling said shell.

2. Temperature responsive apparatus including an elongated one-piece molded plastic shell having a hollow interior, an open end portion and a closed end portion that includes a pair of elongated spaced-apart probes, a temperature responsive device positioned within each said probe to sense fluid temperature, said hollow interior being substantially filled with plastic material within which said temperature responsive devices are encapsulated, each said probe having a cross-sectional outer periphery that is spaced from and completely outside of the cross-sectional outer periphery of the other said probe.

3. The apparatus of claim 2 including mounting means spaced from said probes for mounting said shell to a structure for projection of said probes therethrough into an environment whose temperature is to be monitored by said temperature responsive devices.

4. The apparatus of claim 2 wherein said probes are spaced-apart from one another across a gap, said probes having substantially parallel opposed surfaces on opposite sides of said gap.

5. The apparatus of claim 2 wherein said probes are contained within a circular area, said probes together having a cross-sectional area that is at least as great as one-half said circular area but substantially less than said circular area.

6. The apparatus of claim 2 wherein said shell has a cylindrical portion over the major portion of the length thereof between said open and closed end portions, said probes having a wall thickness that is substantially less than the wall thickness of said cylindrical portion.

7. The apparatus of claim 2 wherein said probes have curved outwardly facing surfaces that are curved to lie substantially on the periphery of a common circle.

* * * * *